Oct. 8, 1968  R. L. KNAUSS  3,404,431
HIDE-PULLING METHOD
Original Filed June 3, 1964  2 Sheets-Sheet 1
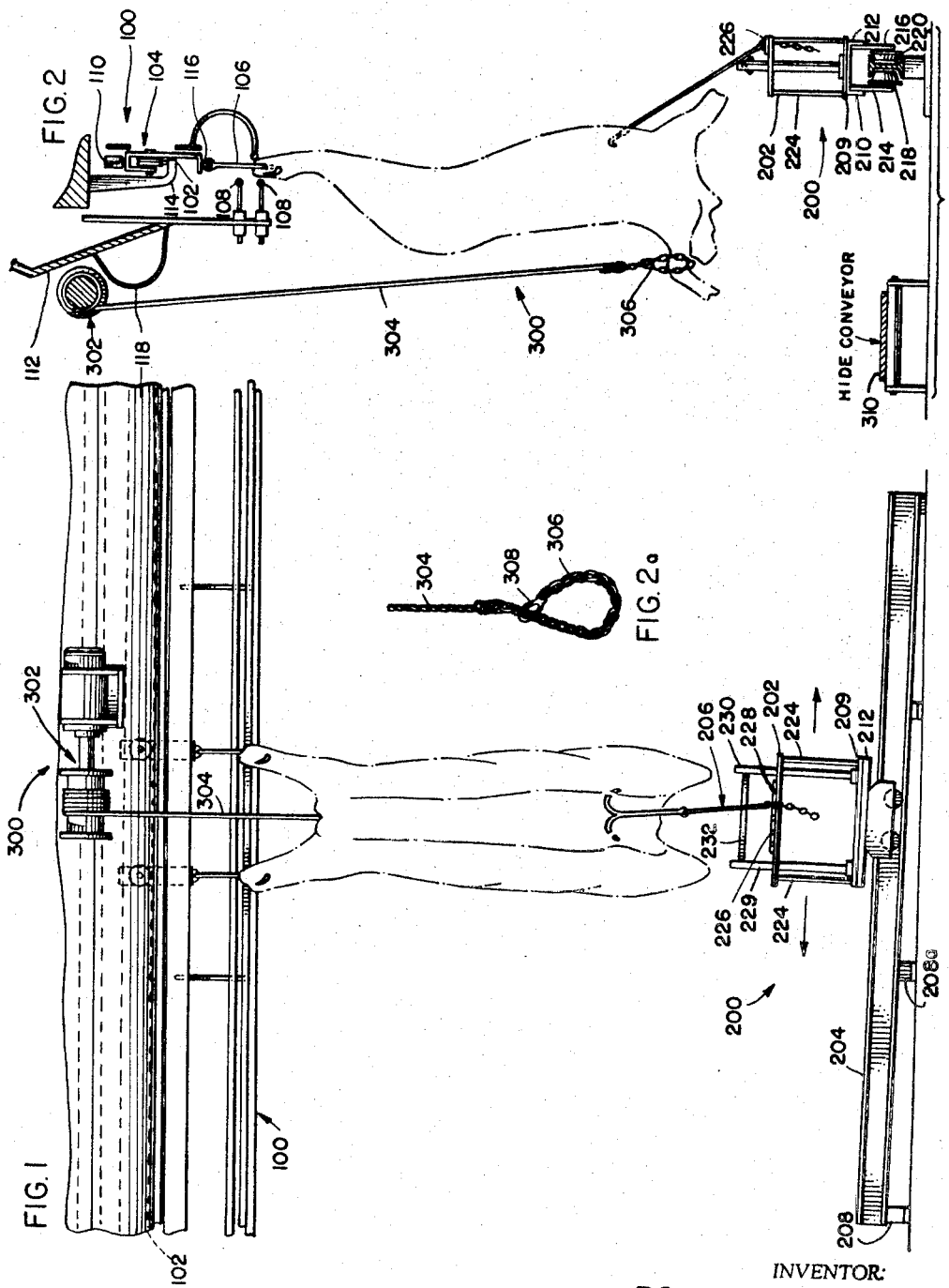
INVENTOR:
ROBERT L. KNAUSS
BY *Carl C. Batz*
ATT'Y

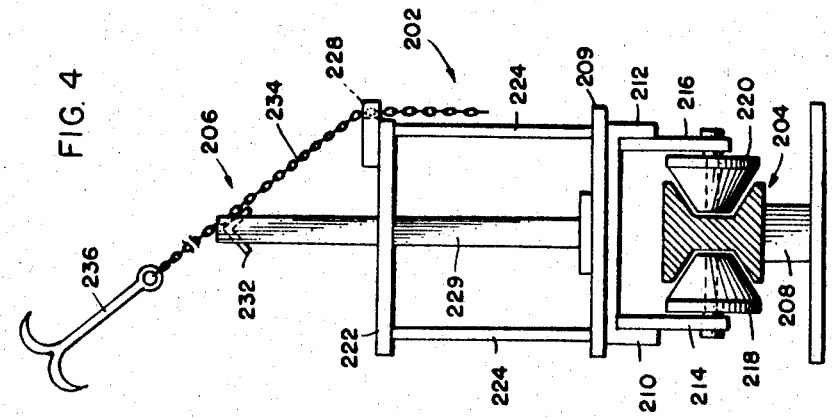
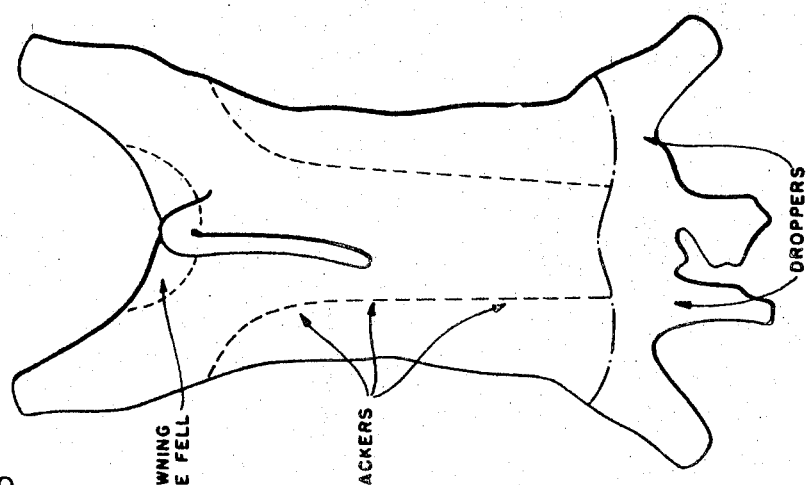

United States Patent Office 3,404,431
Patented Oct. 8, 1968

3,404,431
HIDE-PULLING METHOD
Robert L. Knauss, Omaha, Nebr., assignor to Armour and Company, Chicago, Ill., a corporation of Delaware
Original application June 3, 1964, Ser. No. 372,286, now Patent No. 3,274,639, dated Sept. 27, 1966. Divided and this application June 30, 1966, Ser. No. 568,094
3 Claims. (Cl. 17—45)

ABSTRACT OF THE DISCLOSURE

A method of removing the hide from animal carcasses suspended from the hind legs in which the hide is initially loosened from the lowermost back portions of the carcass, the carcass is secured against upward movement, and the loosened portions of the hide are pulled vertically upwardly over the carcass back to remove the remainder of the hide from the carcass.

*Cross-references to related applications*

This application is a division of my application entitled Hide Pulling Apparatus, filed June 3, 1964, now U.S. Patent No. 3,274,639, issued Sept. 27, 1966.

A recent development in hide removal from beef carcasses has been the recognition that the pulling of hides from carcasses has certain inherent advantages over previously used methods. Even at the present time, most hides are removed from carcasses entirely by hand, utilizing a combination of cutting, skinning, and difficult hand pulling in order to remove the hide from the carcass. In the process of hand removal, the carcass is frequently damaged, the hide is often scored, and in order to permit hand pulling the hide must be extensively cut, and hence damaged for certain possible later usages.

Therefore, one object of the present invention is to provide a method for the effective removal of hide from animal carcasses, which method minimizes hand cutting, hand skinning, and hand pulling operations, and yet obviates carcass damage, hide scoring, and excessive hide cutting.

The present invention was based upon the initial assumption that a properly prepared carcass might be placed in a position to permit the use of an overhead winching arrangement which, when secured to an appropriately loosened hide, could be used to pull the hide completely off the carcass.

However, this projected usage had certain limitations. First, in pulling the hide from the carcass tremendous forces had to be exerted which, acting in opposition to the downwardly disposed carcass, tended to lift the carcass upwardly instead of removing the hide from the carcass. In order to overcome the upward force exerted by the hide removal winch, a hold-down device had to be conceived of which would move with the hide along the dressing railing, which would hold the carcass downwardly to resist the upward forces exerted by the hide removal winch, which would be sterile in operation to prevent the transmission of bacteria and disease from one carcass to another in compliance with the standards of the Bureau of Animal Industries, and which would be sufficiently unobtrusive to permit complete hide removal.

Therefore, it is an object of this invention to provide a new method for pulling hides from carcasses which includes means for holding the carcass down in opposition to upward forces exerted by a hide removal means, which hold-down means moves with the carcass along the dressing rail, which provides sterility in operation to prevent the transmission of bacteria and disease from one carcass to another, and which is unobtrusive in permitting complete hide removal.

Other advantages and objects of the present invention will be evident from an examination of the more particular description and from the drawings, in which—

FIG. 1 is a side elevational view showing a carcass moving along a dressing rail, prepared for dehiding according to a recommended embodiment of the present invention;

FIG. 2 is a front elevational view of the carcass and apparatus shown in FIG. 1;

FIG. 2a is an enlargement of the hide attachment means shown in FIG. 2;

FIG. 3 is a diagrammatic rear plan view of a carcass prepared for dehiding in accordance with this invention; and FIG. 4 is an enlarged front elevational view of the hold-down trolley shown in FIG. 1.

In one embodiment of the invention, the apparatus comprises an overhead carcass conveying dressing rail 100, a hold-down trolley assembly 200, and a hide-pulling winching means 300 shown in FIGS. 1 and 2.

It is to be understood that the overhead carcass conveying dressing rail 100 may be utilized in transporting the carcass for further process steps after the carcass has been initially and preliminarily prepared for the dressing operations. At the stage of the preparing process represented by the dressing rail 100, the carcass has been bled and headed, the gullet has been raised, rodded, tied and pulled, the hide has been ripped open in a straight line from a stick hole in the neck up over the center of the brisket and straight down the belly to the aitch in the center of the crotch, the udders and pizzles have been removed, hind legs skinned and removed, front feet skinned, and the complete viscera has been removed.

The overhead carcass conveying dressing rail 100 is then seen to be comprised of a conventional conveyor rail 102, a plurality of spaced trolleys 104 provided with recessed rollers adapted to engage and move along the conveyor rail 102, a series of supporting shackles or hooks 106 adapted to be attached to and suspended downwardly from the trolleys 104, a pair of swivel retaining bars 108, a trolley retaining bar 110, and a hide protecting shield 112.

The conveying rail 102 extends parallel to the floor along the direction defining carcass movement. This conveying rail 102 may be supported from any appropriate overhead structural member as is indicated in FIG. 2 where the rails are seen to be supported on the underside by a rail hanger support 114.

The trolley 104 in turn may be comprised of a single piece of strap metal which is curved or bent in a generally U shape to provide conventional supporting means for the axles of the roller enclosed between the two opposing sides. The lower portion of the outermost side of the strap is bent to provide a lower base for rotatably receiving the attachment ring 116. The supporting hook 106 also has a ring at its upper end which is received within the attachment ring 116 and which permits the hook to have a swivel and some lateral motion. As will be seen in FIG. 2, the swivel relationship between the hook 106 and the trolley 104 permits the carcass to completely rotate about a vertical axis and to have a certain latitude of movement horizontally without interfering with the seating of the trolley 104 on the conveying rail 102. However, it can also be observed that extreme horizontal movements of the carcass would cause a derailment of the trolley in relationship to the conveying rail.

Two devices are employed to prevent the derailment of the trolley. The first is the use of the swivel retaining bars 108. The purpose of these swivel retaining bars is to prevent the movement of the swivel hook 106 beyond a certain predetermined horizontal limit. Thus, the swivel retaining bars 108 extend horizontally and parallel in spaced relationship to the conveying rail 102 and for a sufficient length to accommodate the complete movement of the carcass through the hide pulling station. In other words, the horizontal extent of the swivel retaining bars 108 will generally approximate the length of the hold-down trolley rail 204 to be discussed in detail later. While two swivel retaining bars 108 are shown in FIG. 2 in this embodiment of the invention, it is to be understood that under certain circumstances a single swivel retaining bar would be sufficient. The swivel retaining bars 108 may be supported by a plurality of spaced rearwardly extended bars to which they are secured, and which in turn are secured to supporting means extending vertically downwardly from some supporting structure.

The second device which is employed to prevent derailment of the trolley 104 is the trolley retaining bar 110. The trolley retaining bar 110 also extends horizontally substantially parallel to, but above and spaced from, the conveying rail 102. The trolley retaining bar 110 is spaced slightly above the base portion of the trolley plate a sufficient distance to allow some movement of the trolley 104 in relation to rail 102, but sufficiently close to prevent excessive movement of the trolley 104 which would disengage it from the guide rail 102. The trolley retaining bar 110 may be supported from some structural support in any conventional manner not interfering with the free movement of the trolley 104 along the rail 102.

The hide protecting shield 112 should be located directly above the rear portion of the carcass when hung at this station, and should extend horizontally substantially parallel to the conveying rail 102. Preferably this hide protecting shield includes an outwardly projecting central portion 118 which permits the hide to be pulled upwardly without becoming entangled or engaged in the overhead carcass conveying apparatus and which also serves to prevent the winching cable 304 from deviating from its normal course of movement during hide pulling and straying into the overhead conveying apparatus. As shown in FIG. 2, the hide protecting shield 112 may be supported from a structural member and in turn provide support for the swivel retaining bars 108.

It is to be understood that the respective trolleys 104 may be secured to a motor driven, endless chain device to permit constant movement of the carcass along the dressing rail at any desired rate.

The hold-down trolley assembly 200 has as its basic purpose the holding down of the carcass in opposition to the force exerted by the hide pulling winching means 300 when the winching means pulls the hide upwardly to remove it from the carcass. To accomplish this function, the hold-down trolley assembly 200 must of course travel with the carcass along the dressing rail at the same rate of movement, must be capable of withstanding the rather excessive forces exerted on the carcass by the hide pulling winching means 300, and to function repetitively without mechanical difficulty.

The preferred hold-down trolley assembly 200, as shown in FIG. 4, is comprised generally of a trolley frame 202, the hold-down trolley rail 204, and a carcass securing means 206.

The hold-down trolley rail 204 is shown as being an I-beam secured with respect to the floor by support members 208 and inclined slightly upwardly in the direction of carcass movement along the conveying dressing rail 100. The incline of the hold-down trolley rail 204 must be sufficient to allow the trolley frame 202 to return by gravity from the forwardmost position to the rearwardmost position in time to permit its use in connection with the next carcass moving along the overhead carcass conveying dressing rail 100.

The hold-down trolley frame 202 is seen to be comprised of a base 208, including an attached underplate 209, having downwardly extending flanges 210 and 212 at each opposing side. Secured to the respective downwardly extending flanges 210 and 212 are two bearing plates 214 and 216, to which the respective rollers 218 and 220 are secured in a conventional manner for rotation. It is to be noted that the rollers 218 and 220 are oppositely tapered to accommodate the inherent taper in, and the indentations of the I-beam 204. An upper attachment plate 222 is spaced from and secured to the lower base plate 208 by means of four supporting bars 224 secured adjacent the respective corners of said plates. Secured to the upper portion of the upper attachment plate 222 is an elongated attachment bar 226 provided with a plurality of spaced notches 228 to permit receipt of the carcass securing means 206 to be described.

To provide additional support for the upper attachment plate 222 and for the carcass securing means 206, two spaced upwardly extending rods 229 and 230 may be secured to the respective plates and extend upwardly through and vertically beyond the attachment plate 222 to provide support for a central bar 232 extending between them.

The carcass securing means 206, in the preferred embodiment, is comprised of a link chain 234 attached to a bifurcated hook 236 in which the opposing hooks curve downwardly to firmly grasp the carcass and resist upward movement. These securing means are of course removable after use and may often be placed in an appropriate sterilizing environment before reuse on another carcass.

The hide pulling winching means 300 has as its basic function the pulling of the hide upwardly off the carcass and thus must exert substantial force on the hide while minimizing horizontal forces tending to move the carcass outwardly, and also to thus inherently provide clean removal of the hide in relation to the carcass without destroying the fell. While any conventional motor-operated winch may be used to operate the winching cable 304, it should be pointed out that various types of emergency stop buttons and operating switches may be utilized in conjunction with the winch in order to provide effective and instantaneous control over the hide pulling operation. Essentially then, the hide pulling winching means 300 is comprised of a motor-driven winch 302, a winching cable 304, and a hide attachment means 306 which may be a chain provided at one end with a ring 308 through which the other end of the chain is passed before being attached to the winching cable 304. It has been found that significantly better hide pulling results are obtained when the hide pulling cable 304 is permitted to move over and extend downwardly from a sheath or pulley located substantially directly over the back of the hanging carcass. This location eliminates the probelm of pull-out which tends to occur, critically, on the top part of the loin and the bottom of the rump area. The vertical height of the cable above the carcass need be only that sufficient to permit complete removal of the hide form the carcass.

Now having described the previous condition of the carcass as well as the apparatus which I have provided at the hide pulling station, the further and improved preparation of the carcass through the hide pulling operation in accordance with this invention will be discussed.

When the carcass has been prepared as before described, the bung is then tied and capped, the bladder is then tied, and the flank is opened.

The next step is that of crowning the fell, which is to be distinguished from the present conventional step of cutting the fell. Although the fell cutter has traditionally been responsible for numerous operations, for the purpose of this description his conventional functions will be confined only to those which relate to hide removal. Conventionally, the fell cutter began with the floorsman's cut across the inside of the round and then cleared the hide out over the top of the rump and round, over the outside of the hock and shank, leaving the hide hanging in an approximately V shape along the line from the stifle joint to the base of the tail. However, in the present invention, there is a major departure from the conventional method of the hide being removed downwardly from the top of the carcass as it hangs on the dressing rail. According to this invention, the hide is removed upwardly over the carcass in the direction of the overhanging dressing rail. Thus, this conventional step of cutting the fell is substantially modified. The substitute step of the present invention is called "crowning the fell." In this step, a U shaped area as shown in dotted lines in FIG. 3 is cut starting under the hide just above the rectum and skinning the hide up to the floorsman's pattern, over the top of the round and rump down to and around the bung, on either side, to expose the edges of the white fell of the around sufficiently that it will not be torn during pulling, thus eliminating the black eye effect. Of course, the steps of fell pulling, rumping, tail splitting and pulling are completely eliminated as hand operations.

The backing operation as it is conventionally practiced consists in clearing out the back on each side, backing through over the spinal column and finally cutting the attachment of the tail head to drop the hide down to the top of the shoulders. Of course, this step is also radically modified inasmuch as the hide does not have to be dropped down to the top of the shoulder in view of the pulling operation. Thus, the backing operation consists in loosening the hide to the point indicated by the dashed lines in FIG. 3, eliminating the need of the backer to back through over the spinal column.

Likewise, the operation of dropping the hide conventionally consists of removing the hide from its remaining connections at the top and sides of the neck, and was the last skinning operation required to remove the hide from the beef. However, the present invention teaches that the dropping operation consists merely of loosening the hide by cutting it free from the carcass to the points indicated by the dash and dotted line indicated at the lower portion of the carcass as shown in FIG. 3.

At this stage, the carcass is then ready for the hide pulling operation. The sterilized hooks of the carcass securing means 206 are thrust into the flesh covering the breastbone, on the lower portion of the carcass. The lower end of the carcass securing means is then thrust into the appropriate notch 228 in the attachment bar 226, which causes the hold-down trolley assembly 200 to move along the hold-down rail 204 with the carcass as it is being moved along the overhead carcass conveying dressing rail 100. The lower portion of the hide on the back side of the carcass which has been freed by the dropping operation is then gathered together and the loop of chain 306 passed around the hide and pulled tightly through the ring 308. The winch 302 is then started in operation, pulling the winching cable 304 upwardly as the carcass is moved along the overhead rail 100. The hide is then pulled upwardly from the downwardly projecting neck of the carcass up over the back, up over the rear legs and the tail of the carcass until it is completely freed from the carcass. The hide may then be dropped downwardly onto a hide conveyor such as that shown in FIG. 2 at 310. When the hook 236 is removed from the carcass, the hold-down trolley 200 is returned by gravity to its initial position for use with the next carcass.

From the foregoing particular description and the drawings it is seen that the method and apparatus of this invention provide for hide removal from animal carcasses which minimizes hand cutting, hand skinning, and hand pulling operations, and yet obviates carcass damage, hide scoring, and excessive hide cutting, and which includes effective means for holding the carcass down in opposition to upward forces exerted by the hide removal means, which hold-down means moves with the carcass along the dressing rail, which provides sterility in operation to prevent transmission of bacteria from one carcass to another, and which is unobtrusive in permitting complete hide removal.

I claim:

1. A process of pulling hides from carcasses comprising the steps of hanging said carcass to extend vertically downwardly from the hind legs, loosening the hide from the lower back portion of said carcass, securing the lower portion of said carcass against upward movement, and pulling said loosened hide substantially vertically upwardly over the carcass back until it is entirely removed from said carcass.

2. In a process for pulling hides from carcasses, the steps of hanging said carcass to extend downwardly from the hind legs, loosening the hide from the lower back portion of the carcass, crowning the fell by cutting the hide above the tail in a substantially U-shaped pattern out along the round on either side to expose the white edges of the fell of the round, securing the lower breast side of the carcass against upward movement, pulling said loosened lower back hide substantially vertically upwardly over the carcass back until it is entirely removed from the carcass.

3. In a process for pulling hides from carcasses the steps of ripping the hide open in a straight line from the stick hole in the neck up over the center of the brisket and straight down the belly to the aitch in the center of the crotch, hanging said carcass to extend downwardly from the hind legs, loosening the hide from the lower back portion of the carcass and from the straight rip to a line approximately twelve inches on either side of the backbone, crowning the fell by cutting the hide above the tail in a substantially U-shaped pattern out along the round on either side to expose the white edges of the fell of the round, securing the exposed lower breast side of the carcass against upward movement, and pulling the loosened back hide substantially vertically upwardly over the carcass back until the hide is completely removed from the carcass.

References Cited

UNITED STATES PATENTS

| 3,129,454 | 4/1964 | Johnson | 17—21 |
| 3,187,377 | 6/1965 | Hager et al. | 17—21 |
| 3,229,328 | 1/1966 | Schmidt | 17—21 |
| 3,235,905 | 2/1966 | Schmidt | 17—21 |

FOREIGN PATENTS

| 251,963 | 5/1964 | Australia. |

LUCIE H. LAUDENSLAGER, *Primary Examiner.*